July 12, 1949.   K. K. PROBST   2,475,803
TRANSFER BOX FOR FOUR-WHEEL DRIVE VEHICLES
Filed Feb. 7, 1944   2 Sheets-Sheet 1
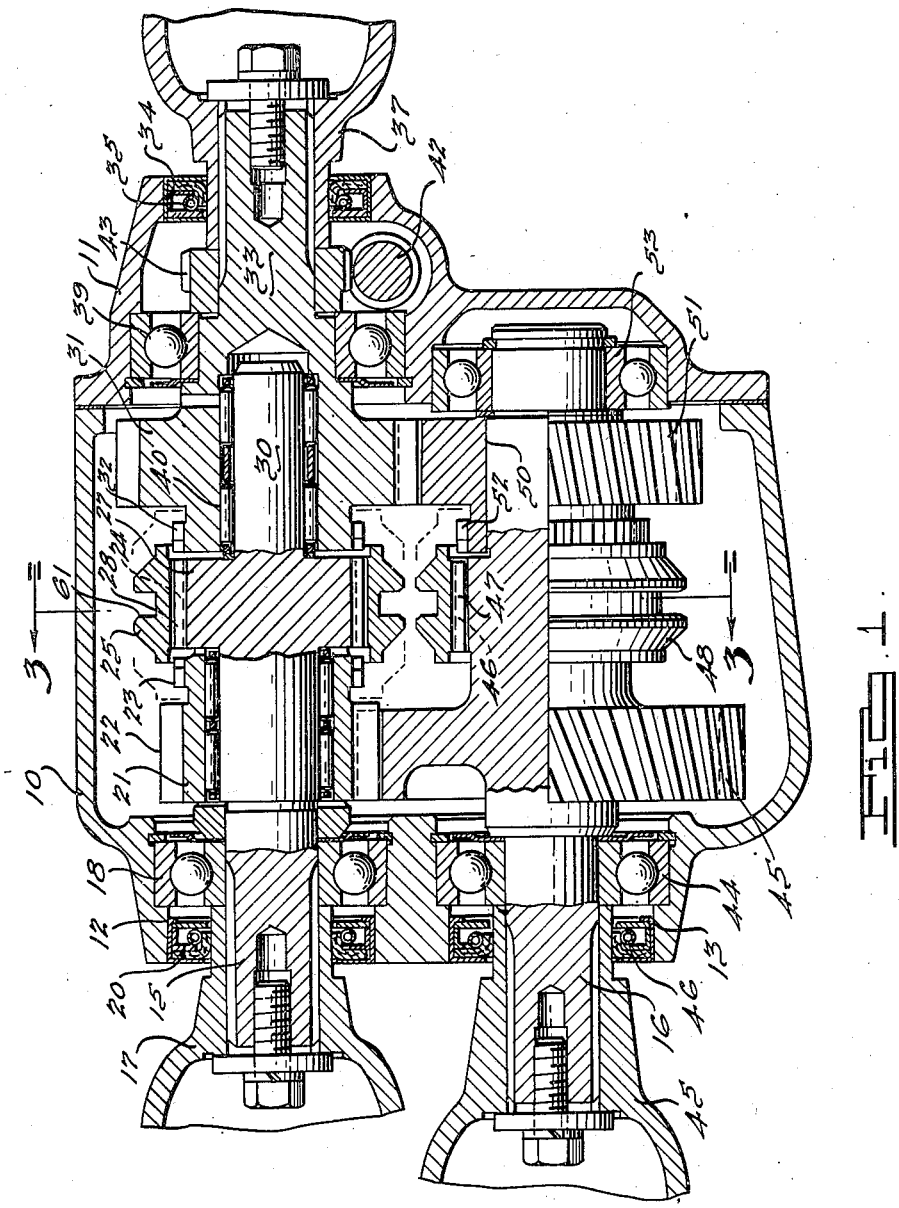
INVENTOR.
Karl K. Probst.
BY
Harness, Dickey & Pierce.

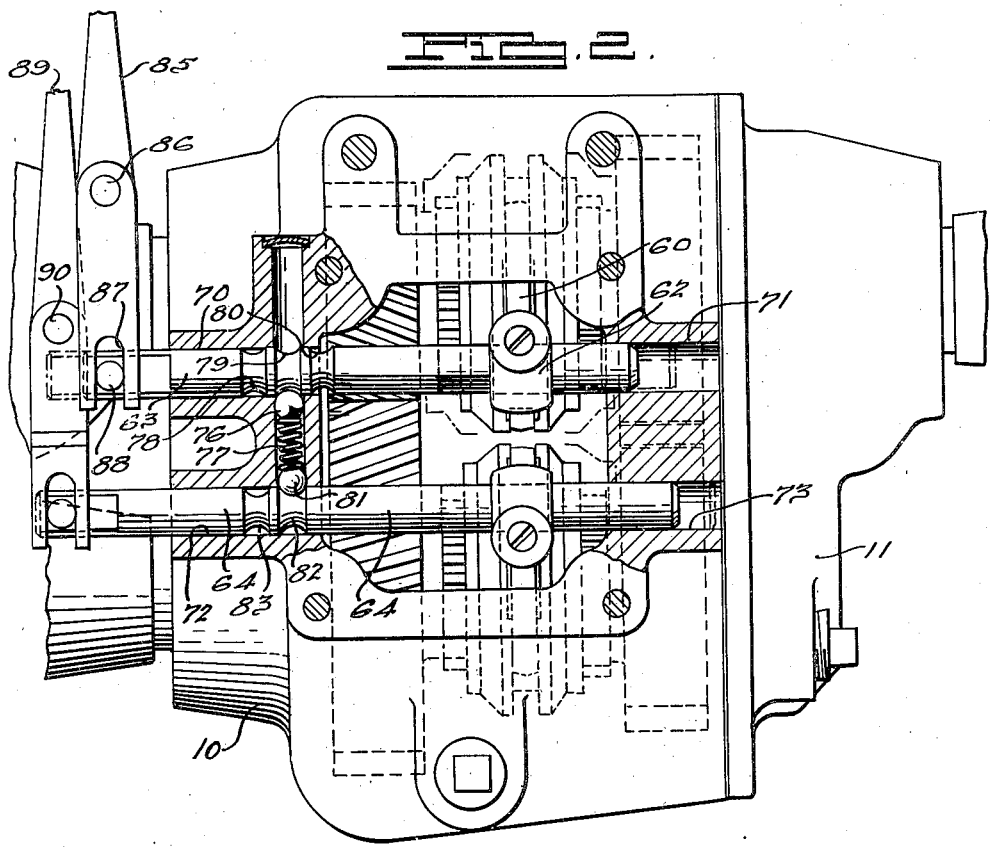
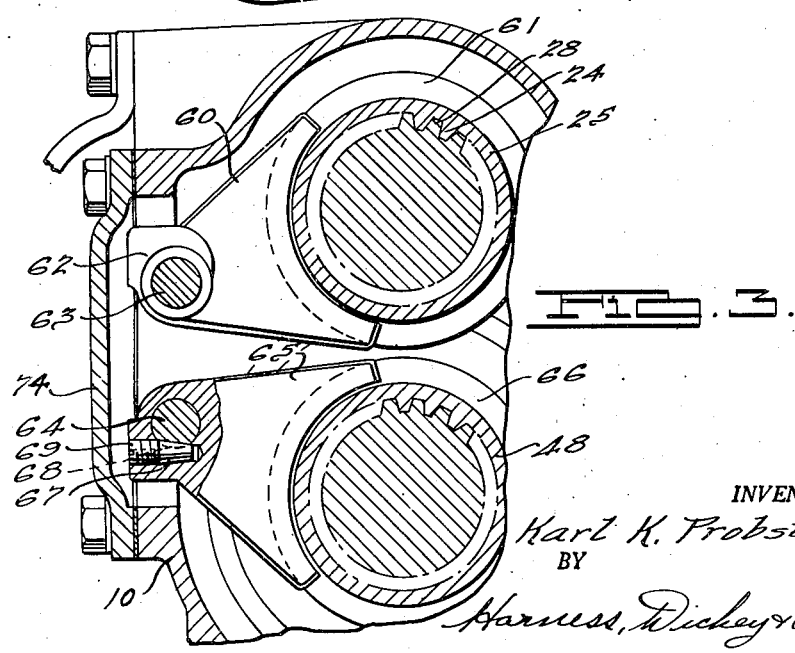

Patented July 12, 1949

2,475,803

UNITED STATES PATENT OFFICE 2,475,803

TRANSFER BOX FOR FOUR-WHEEL DRIVE VEHICLES

Karl K. Probst, Highland Park, Mich., assignor to Henry J. Kaiser Company, Oakland, Calif., a corporation of Nevada Application February 7, 1944, Serial No. 521,332

5 Claims. (Cl. 74—333)

The invention relates generally to automotive vehicles and it has particular relation to a transfer box through which an engine shaft may be connected to wheel driving shafts.

One object of the invention is to provide an improved type of transfer box which has fewer parts and is simpler to manufacture and assemble so as to reduce the cost of manufacture.

Another object of the invention is to provide an improved type of transfer box which requires a smaller amount of space and, hence, which better fits designs of smaller power-driven vehicles.

Another object of the invention is to provide a simple form of transfer box by means of which all four wheels of a vehicle may be driven or only two of the wheels driven, depending upon which drive is selected.

Another object of the invention is to provide an improved transfer box which obtains a two-speed drive in a simple and easily selective manner.

Other objects of the invention will become apparent from the following specification, from the drawings relating thereto, and from the claims hereinafter set forth.

For a better understanding of the invention, reference may be had to the accompanying drawings forming a part of the specification, wherein:

Figure 1 is a cross-sectional view illustrating a transfer box constructed according to one form of the invention;

Figure 2 is a side-elevational view of the transfer box shown by Figure 1, with certain parts broken away so as to illustrate structural relations; and Figure 3 is a cross-sectional view taken substantially along the line 3—3 of Figure 1.

Referring to the figures in the drawings, the transfer box illustrated includes a casing member 10 and a second casing member or cover 11 which may be connected to the member 10 by bolts as will be readily understood. The wall of the member 10 opposite the cover 11 has openings 12 and 13 for allowing shafts 15 and 16, respectively, to project into the casing. A universal joint member, such as a universal joint yoke 17, is keyed to the outer end of the shaft 15 and inwardly of the hub of the yoke, the shaft is rotatably mounted in a ball bearing 18. A grease seal 20 may be provided in the opening 12 between the outer wall thereof and the hub of the yoke arm for preventing escape of grease from the casing.

Inwardly of the casing, the shaft 15 is provided with a first gear 21 rotatable on the shaft and having teeth 22 meshing with a lower gear presently to be mentioned. Inwardly beyond the inner ends of the teeth 22, the gear 21 has a separate series of teeth 23 and these are adapted to engage teeth 24 formed on the inner periphery of a clutch ring 25. This clutch ring encircles a larger portion 27 on the shaft 15 and such larger portion of the shaft has teeth 28 engaging the teeth 24 on the clutch ring. If the clutch ring is moved to the left, as seen in Figure 1, the teeth 24 will move into engagement with the teeth 23 on the gear 21 and hence this gear will become drivingly locked to the shaft.

At the opposite side of the larger portion 27, the shaft 15 is reduced in diameter, as indicated at 30, and rotatably supports a gear 31 having auxiliary teeth 32 for engaging the teeth 24 on the clutch ring. The gear 31 is formed integrally with a second shaft 33 projecting outwardly through an opening 34 in the wall of the cover member 11 and a grease seal 35 is provided in the opening 34, and contacts the hub of a second yoke 37 keyed to and fastened to the shaft 33. A ball bearing 39 rotatably supports the shaft 33 adjacent the gear 31 and both of the ball bearings 18 and 39 are located in aligned relation so that the axes of both shafts 15 and 33 will coincide. This factor, in cooperation with the fitting of the smaller portion 30 of shaft 15 within the gear 31, holds the two shafts accurately in alignment. Preferably, small roller bearings, such as indicated at 40, are provided between the inner surface of each gear and the shaft portion upon which it is mounted. It may be mentioned here that a speedometer connection may be obtained with the shaft 33 by means of a worm 42 projecting into the cover 11 and engaging a worm wheel 43 keyed to the shaft.

The shaft 16 similarly is mounted in a ball bearing 44 and the outer end of the shaft is secured to a universal joint yoke 45. A seal 46 is provided between the opening 13 and the hub of the joint in the same manner as previously stated. Inwardly of the ball bearing 44, the shaft 16 has a gear 45 thereon which meshes with the teeth 22 of the gear 21. Inwardly of the gear 45, the shaft has a portion provided with teeth 46 and these teeth engage teeth 47 on a second clutch ring 48. Beyond the clutch ring, the shaft has a smaller portion 50, upon which a gear 51 is rotatably mounted and this gear next to the clutch ring 48 has teeth 52 adapted to mesh with the teeth 47 on the clutch ring when the latter is shifted to the right. Beyond the gear 51, the shaft 16 is rotatably mounted in a ball bearing 53 which is located in the casing part 11. The gear 51 meshes with the gear 31 on the upper shaft and when the clutch ring 48 is shifted to the right so that the teeth 47 and 52 engage, gear 51 rotates with shaft 16 and gear 45.

Considering the shaft 15 as the engine shaft or driving shaft, it will be apparent that if the clutch ring 25, sometimes hereinafter referred to as the first clutch ring, is shifted to the right, gear 31 will be driven directly by shaft 15 and hence shaft 33 and universal joint member 37 will be directly driven and at the same rate of speed as the driving shaft 15. A shaft connected to the universal joint member 37 may lead to the rear axle or rear wheels of the vehicle so that the rear wheels will be driven when shaft 33 is turned. If, on the other hand, the first clutch ring 25 is shifted to the left, gear 21 is driven and in turn gear 45 and shaft 16 are driven. If the clutch ring 48 is shifted to the right at the same time that clutch ring 25 is shifted to the left, gear 51 will also be driven when shaft 16 is driven and in turn gear 31 meshing with gear 51 will be driven, and finally shaft 33 will be driven also.

Gears 31 and 51 are of the same size and have the same number of teeth so that the speed of shaft 16 is directly transmitted to the shaft 33 in a one-to-one ratio when the clutch 25 is shifted to the left and the clutch ring 48 is shifted to the right. The gear 45 has a different number of teeth as compared to gear 21 and may for instance be nearly in the ratio of 2 to 1 so that when gear 21 is driving gear 45 with clutch ring 25 shifted to the left, the speed of shaft 16 may be on the order of half of the speed of shaft 15. With clutch ring 25 shifted to the right and clutch ring 48 out of engagement with the teeth 52 on gear 51, shaft 33 alone is driven at the same rate of speed as shaft 15, as mentioned previously.

The shaft 16 may lead to the front wheels of the vehicle and it might be mentioned here that this shaft can be connected to other shafts leading directly to the wheels so that when shaft 16 is rotated, both front wheels will be rotated. A similar connection may be provided between the rear end of a shaft connected to shaft 33 so that each of the rear wheels will be driven, or, if desired, the universal joint member 37 may be connected to a rearwardly directed transmission shaft leading to a rear axle of the usual type. In any event, rotation of shaft 16 preferably drives the front wheels and rotation of shaft 33 preferably drives the rear wheels. Accordingly, when the clutch member 25 is shifted to the right, the rear wheels will be driven at the same rate of speed as the engine driving shaft 15, or, in other words, a high rate of speed may be obtained. When the clutch ring 25 is shifted to the left and clutch ring 48 to the right, both shafts 16 and 33 will be driven at a lower speed and all four wheels of the vehicle will be driven. Hence, the engine may turn all four wheels through a reduction gearing and it follows that much greater power may be obtained. When the vehicle is pulling a large load, it may be desirable to have this reduction gearing and to drive all four wheels, while, on the other hand, if the load is not large and speed is desired, a direct drive may be obtained through the shaft 33 leading to the rear wheels while allowing the front wheels to be free from driven connection with the engine.

Referring now in particular to Figures 2 and 3, an arrangement for shifting the clutch ring 25 in either direction includes a fork 60 fitting in a groove 61 in the clutch ring 25. This fork has a hub portion 62 secured to a pin 63 and from this it will be apparent that if the pin is shifted axially, the clutch ring may be shifted axially also. Below the pin 63, a second pin 64 is provided for shifting the clutch ring 48 and this pin has a fork 65 similarly fitting a groove 66 in the clutch ring. For fastening the hub of each fork to its pin, a wedge pin 67 may be provided which fits a similar opening in the hub of the fork and a groove 68 in the pin, and for holding the wedge in position, a stud 69 may be threaded into the opening. The pin 63 is slidably supported in openings 70 and 71 formed in an auxiliary part of the casing member 10 while the pin 64 is similarly slidable in openings 72 and 73. A small cover plate 74 secured to the casing part 11 by bolts provides access to the forks.

The pin 63 may be held in any of three positions so that the clutch ring 25 will be either in neutral position as shown in Figure 1, or so that it will be shifted either to the left or the right. For holding the parts in any one of the three positions, a spring-pressed ball 76 is provided in an opening 77 in the casing and the ball selectively may engage annular grooves 78, 79 and 80 in the pin. This engagement is such that the pin may be shifted past the ball with a given amount of force although normally the ball holds the parts against any loose or accidental shifting. A like ball 81 at the lower end of opening 77 cooperates with grooves 82 and 83 in pin 64 to hold the latter in either of the two positions required for ring 48 to be disengaged from and engaged with teeth 52 on gear 51.

For shifting the pin 63, a control lever 85 is pivoted on a stationary pin 86 and the lower end of this control lever has a fork 87 which straddles a pin 88 fastened to the outer end of the pin. Swinging of the control lever 85 about the pin 86 thus effects axial shifting of the pin 63 in one direction or the other. A like lever 89 pivoted at 90 is used to move the pin 64.

From the foregoing description it will be apparent that the driver of a vehicle may quickly use one or both driven shafts and that he may connect the rear wheels to the engine shaft by a direct high speed engagement when the clutch-ring 25 is shifted to the right or drive the rear wheels through a low speed engagement by shifting ring 25 to the left and ring 48 to the right so as to drive through gear 21, 45, 51 and 31. The front wheels may be driven at high speed also by shifting ring 48 to the right when ring 25 is shifted to the right and they are driven at low speed when the ring 25 is shifted to the left and ring 48 is shifted to the right. It will be noted that the rear wheels cannot be driven at the lower speed unless the front wheels are also driven at the lower speed and that the front wheels may or may not be driven at the higher speed along with the rear wheels. It is possible, too, to drive the front wheels alone at low speed by shifting ring 25 to the left while leaving ring 48 in neutral.

Moreover, it will be apparent that the parts are well arranged and that manufacture and assembly is simple. It is to be noted too that the forks 60 and 65 are located at the cover plate 74 so that these parts may be loosened from the pins 63 and 64, and then, after removal of the pins, the forks may be withdrawn through the opening normally closed by the plate.

Although only one form of the invention has been described and illustrated in detail, it will be apparent to those skilled in the art that various modifications may be made without departing from the scope of the appended claims.

What is claimed is:

1. A transfer box comprising a casing, a driving shaft extending into the casing from one side, a driven shaft coaxial to the driving shaft and extending into the casing from the opposite side, a loose gear on the driving shaft, a fixed gear on the driven shaft, a clutch member movable along the driving shaft between the two gears and drivingly connected to said driving shaft, clutch means on the two gears adapted to cooperate with the clutch member so as selectively to connect the gears to the driving shaft depending upon direction of axial movement of the clutch member, a second driven shaft projecting into the casing and parallel to the driving shaft, a gear fixed on the second driven shaft and constantly meshing with the loose gear on the driving shaft, a gear loose on the second driven shaft and being of the same size as the gear fixed on the first driven shaft and constantly meshing therewith, and a clutch member on the second driven shaft and operable independently of the first clutch member for connecting the loose gear thereon to such shaft or disconnecting it therefrom, the loose gear on the driving shaft being smaller than the fixed gear on the second driven shaft.

2. A transfer box of the character described comprising, a drive shaft, a first driven shaft, a gear rotatably mounted on said drive shaft, a gear fixed to said driven shaft, first clutch means associated with said drive shaft for selectively clutching the same to said first driven shaft or for clutching the gear rotatable on said drive shaft thereto, a second driven shaft, a gear fixed on said second driven shaft having meshing engagement with the rotatable gear on said drive shaft, a gear rotatable on said second driven shaft having meshing engagement with the gear fixed to said first driven shaft, and second clutch means associated with said second driven shaft operable independently of said first clutch means for selectively connecting the gear rotatable thereon thereto or disconnecting it therefrom.

3. A transfer box of the character described comprising, a drive shaft, a first driven shaft, a gear rotatably mounted on said drive shaft, a gear fixed to said driven shaft, first clutch means associated with said drive shaft for selectively clutching the same to said first driven shaft or for clutching the gear rotatable on said drive shaft thereto, a second driven shaft, a gear fixed on said second driven shaft having meshing engagement with the rotatable gear on said drive shaft, a gear rotatable on said second driven shaft having meshing engagement with the gear fixed to said first driven shaft, said gear fixed to said first driven shaft and said gear rotatable on said second driven shaft being of the same size, and clutch means associated with said second driven shaft operable independently of said first clutch means for selectively connecting the gear rotatable thereon thereto or disconnecting it therefrom.

4. A transfer box of the character described comprising, a drive shaft, a first driven shaft, a gear rotatably mounted on said drive shaft, a gear fixed to said first driven shaft, first clutch means associated with said drive shaft for selectively clutching the same to said driven shaft or for clutching the gear rotatable on said drive shaft thereto, a gear fixed on said second driven shaft having meshing engagement with the rotatable gear on said drive shaft, said gear fixed on said second driven shaft being larger than the gear rotatably mounted on said drive shaft, a gear rotatable on said second driven shaft having meshing engagement with the gear fixed to said first driven shaft, said gear rotatable on said second driven shaft and said gear fixed to said first driven shaft being of the same size, and second clutch means associated with said second driven shaft operable independently of said first clutch means for selectively connecting the gear rotatable thereon thereto or disconnecting it therefrom.

5. A transfer box of the character described comprising a drive shaft, a pair of driven shafts, a low speed gear train connectible between said drive shaft and one of said driven shafts, a clutch engageable selectively to establish said low speed gear train or to connect the drive shaft with the other of said driven shafts, a one-to-one speed gear train connectible between said pair of driven shafts, and a clutch engageable to establish said last mentioned gear train, said pair of driven shafts both being driven at a low speed ratio when said two gear trains are established and being driven at a one-to-one speed ratio when the drive shaft is connected with said one of said driven shafts and the one-to-one speed gear train is established between said driven shafts.

KARL K. PROBST.

REFERENCES CITED

The following references are of record in the file of this patent:

UNITED STATES PATENTS

| Number | Name | Date |
| --- | --- | --- |
| 954,531 | Mack | Apr. 12, 1910 |
| 959,878 | Page | May 31, 1910 |
| 2,174,187 | Freitag | Sept. 26, 1939 |
| 2,285,106 | Bixby | June 2, 1942 |